US007518457B2

(12) United States Patent
Karasawa et al.

(10) Patent No.: US 7,518,457 B2
(45) Date of Patent: Apr. 14, 2009

(54) MICROWAVE GENERATOR USING A DIAMOND SAW OSCILLATOR

(75) Inventors: Hideo Karasawa, Minowa-machi (JP); Yoshiaki Matsumoto, Minowa-machi (JP); Masahiro Onuki, Minowa-machi (JP); Masayasu Sakuma, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 49 days.

(21) Appl. No.: 11/536,499

(22) Filed: Sep. 28, 2006

(65) Prior Publication Data

US 2007/0068909 A1 Mar. 29, 2007

(30) Foreign Application Priority Data

Sep. 28, 2005 (JP) ............................ 2005-282116

(51) Int. Cl.
*G09G 3/10* (2006.01)
*B23K 9/00* (2006.01)

(52) U.S. Cl. ............... 331/158; 310/313 A; 219/212.43

(58) Field of Classification Search ................. 331/158; 310/313 A; 219/121.43
See application file for complete search history.

(56) References Cited

U.S. PATENT DOCUMENTS

| | | | | |
|---|---|---|---|---|
| 5,148,122 | A * | 9/1992 | Karlquist | 331/3 |
| 2006/0081624 | A1 * | 4/2006 | Takada et al. | 219/716 |
| 2007/0069607 | A1 * | 3/2007 | Karasawa et al. | 310/313 A |

FOREIGN PATENT DOCUMENTS

| | | |
|---|---|---|
| JP | A 9-265914 | 10/1997 |
| JP | A 2004-265611 | 9/2004 |

* cited by examiner

*Primary Examiner*—Joseph Chang
(74) *Attorney, Agent, or Firm*—Oliff & Berridge, PLC

(57) ABSTRACT

A microwave generator comprises: a high-frequency power section that includes a diamond SAW oscillator and outputs a high-frequency signal outputted from the diamond SAW oscillator to a subsequent stage; and a waveguide unit that emits the high-frequency signal inputted from the high-frequency power section in a form of microwave.

6 Claims, 5 Drawing Sheets

MICROWAVE GENERATOR USING A DIAMOND SAW OSCILLATOR

BACKGROUND

1. Technical Field

The present invention relates to a microwave generator and an apparatus using the same.

2. Related Art

The Industry Science Medical (ISM) band that takes advantage of microwave is utilized in a variety of apparatuses including heating units, plasma generating devices, communications equipments and radar systems. In order to radiate such microwave, some microwave generators use magnetron for the oscillating source.

JP-A-9-265914 is a first example of related art disclosing a magnetron apparatus that includes a high-voltage noise filter. According to the example, a small and low-cost high-voltage noise filter can be obtained by: providing an insulating layer and a conductive layer on the surface of a coiled conductors providing another layer having a high withstand voltage between the conductive layer and the outer peripheral surface of the insulating layer near the end of the conductive layer, thus alleviating the electric field concentration and improving the withstand voltage characteristic of the insulating layer; and, in addition, reducing the thickness of the insulating layer, JP-A-2004-265611 is a second example of related art disclosing a plasma processing device. According to the example, the plasma processing device uses a high-frequency source that is composed of magnetron, and the like.

FIG. 8 is a diagram showing the relation between the frequency and the strength in signals outputted from the magnetron. Here, the axis of abscissas represents the frequency and the axis of ordinate represents the strength. Besides outputting a specific frequency $f_2$ that is needed for generating microwave, the magnetron used for generating microwave also outputs some other frequencies existing around the specific frequency $f_2$. In other words, frequency signals outputted from the magnetron has a bandwidth. Therefore, for example, when a specific frequency $f_2$ of 2.45 GHz is required, the magnetron also outputs some other frequencies that exist around 2.45 GHz. Consequently, the magnetron generates unwanted radiation, thereby giving rise to a problem that other apparatuses are adversely affected in such a way that they become incapable of communicating wirelessly in using the ISM band.

Also, since magnetron is large in size, it has so far hindered reduction in the size and weight of microwave generators using magnetron. In recent years, on the contrary, reduction of size and weight is increasingly required for some apparatuses using a microwave generator, and this, in turn, also requires microwave generators to become reduced in size and weight. However, microwave generators using magnetron for the oscillating source have been incapable of meeting this requirement. In addition, magnetron has also had some other problems including a significant amount of power consumed, poor frequency temperature behavior, and instability in outputted frequency, and so on.

Apart from the use of magnetron, an LC oscillator or a dielectric oscillator may also be used for the oscillating source in a microwave generator. Or, the frequency signals outputted from the oscillating source may be converted into high frequency signals through a phase-locked loop (PLL) circuit or a frequency multiplier circuit, to be used in a microwave generator. However, LC oscillators and dielectric oscillators have had such problems as poor frequency temperature behavior, instability of outputted frequency, a significant amount of jitters and variability in the frequency between each oscillator. On the other hand, PLL circuits and multiplier circuits have had problems including their large size that hinders size-reduction, the significant amount of power they consume and the significant amount of time they take in order to output the required frequency. Furthermore, PLL circuits have an additional problem that they are incapable of outputting a required frequency if any unlocking occurs.

SUMMARY

An advantage of the invention is to provide a microwave generator that is reduced in size and weight and capable of preventing unwanted radiation. It is another advantage of the invention to provide an apparatus using the microwave generator.

According to a first aspect of the invention, a microwave generator has a diamond SAW oscillator, a high-frequency power section that outputs the high-frequency signals outputted from the diamond SAW oscillator to a subsequent stage and a waveguide unit that emits the high-frequency signals inputted from the high-frequency power section in the form of microwave.

The diamond SAW oscillator is capable of outputting only those high-frequency signals that correspond to the resonance frequency of the SAW, being excited on the substrate, without outputting signals corresponding to any frequency other than the resonance frequency and without oscillating with an abnormal frequency. Therefore, use of the diamond SAW oscillator improves the signal purity. Furthermore, guiding a high-frequency signal from the high-frequency power section to the waveguide unit will allow radiation of only the radio wave corresponding to the frequency of the high-frequency signals, namely only microwave, thereby preventing unwanted radiation. Consequently, the microwave generator is capable of reducing noise, thereby preventing adverse effects on apparatuses using the ISM band.

It is preferable that the high-frequency power section of the microwave generator includes: the diamond SAW oscillator that outputs high-frequency signals; a first amplifier that amplifies and outputs the high-frequency signals inputted from the diamond SAW oscillator; and a power source that supply power to the diamond SAW oscillator and to the first amplifiers.

Through the first amplifier that is provided subsequent to the diamond SAW oscillator, the high-frequency signals outputted from the diamond SAW oscillator can be amplified, resulting in their magnified signal strength.

In this case, the high-frequency power section of the microwave generator may include: the diamond SAW oscillator that outputs the high-frequency signals; a plurality of first amplifiers that are connected in parallel to the diamond SAW oscillator, each inputting the high-frequency signals from the diamond SAW oscillator; an adder that is connected subsequent to the first amplifiers and inputs and adds the high-frequency signals outputted from the first amplifiers in order to subsequently output the added high-frequency signals; and a power source that supplies power to the diamond SAW oscillator and to the first amplifiers.

With the plurality of first amplifiers provided subsequent to the diamond SAW oscillator, the high-frequency signals outputted from the diamond SAW oscillator can be amplified. In addition, since the high-frequency signals outputted from each of the first amplifiers are added together, the signal strength can be increased. In other words, the high-frequency power section provides a higher power to the high-frequency signals.

It is preferable that the diamond SAW oscillator of the microwave generator forms a looped circuit that includes a phase shift circuit for inputting power, a diamond SAW resonator having at least a comb-like electrode placed on a substrate using diamond, a second amplifier that amplifies the high-frequency signals outputted from the diamond SAW resonator, a power divider that distributes the high-frequency signals outputted from the second amplifier to the phase shift circuit and to the output side. In this case, a buffer circuit may be connected to the output side of the power divider.

The diamond SAW resonator employs a substrate using diamond and, therefore, has good frequency temperature behavior. Consequently, the microwave generator using the diamond SAW resonator has improved frequency temperature behavior and improved frequency stability. In addition, being manufactured by a fine processing technology, the diamond SAW resonator can be reduced in size and weight, which, in turn, allows size and weight reduction of the microwave generator using the diamond SAW resonator. Also, the fine processing technology allows no variability in the resonance frequency between each resonator manufactured. The diamond SAW resonator excites SAW, on the substrate as soon as signals are inputted from the phase shift circuit and outputs high-frequency signals corresponding to the frequency of the SAW. Thus, the high-frequency signals can be outputted immediately after power is supplied from the high-frequency power section of the diamond SAW oscillator. This reduces the starting time between supply of power and radiation of microwave in the microwave generator.

According to a second aspect of the invention, an apparatus using the microwave generator has a waveguide unit placed inside a container for containing the microwave and guides the microwave emitted from the waveguide unit into the container. In this case, the container may be a plasma-generating container, a heating container, a waveguide, or the like. Thus, an apparatus that utilizes the microwave emitted from the microwave generator having the aspect described above can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will now be described.

First Embodiment

Figure 1:
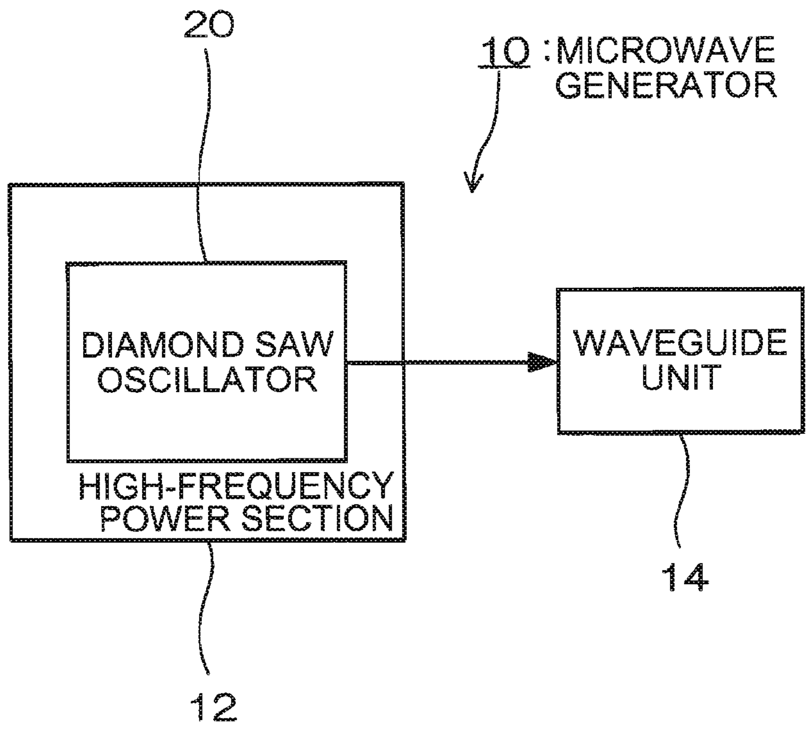
FIG. 1 is a block diagram of the microwave generator.

A microwave generator according to a first embodiment of the invention is shown in the block diagram in FIG. 1. The microwave generator 10 has a high-frequency power section 12 that includes a diamond surface acoustic wave (SAW) oscillator 20. The high-frequency power section 12 outputs high-frequency signals obtained in the diamond SAW oscillator 20 to a subsequent stage. The high-frequency signals are used to generate microwave. The microwave generator 10 includes a waveguide unit 14 that is connected subsequent to the high-frequency power section 12. The waveguide unit 14 inputs the high-frequency signals from the high-frequency power section to radiate the high-frequency signals in the form of microwave. The waveguide unit 14 may be an antenna, or may include an antenna and an isolator. Providing an isolator between the high-frequency power section 12 and the antenna prevents reflected waves generated in the antenna from returning to the high-frequency power section 12.

Figure 2:
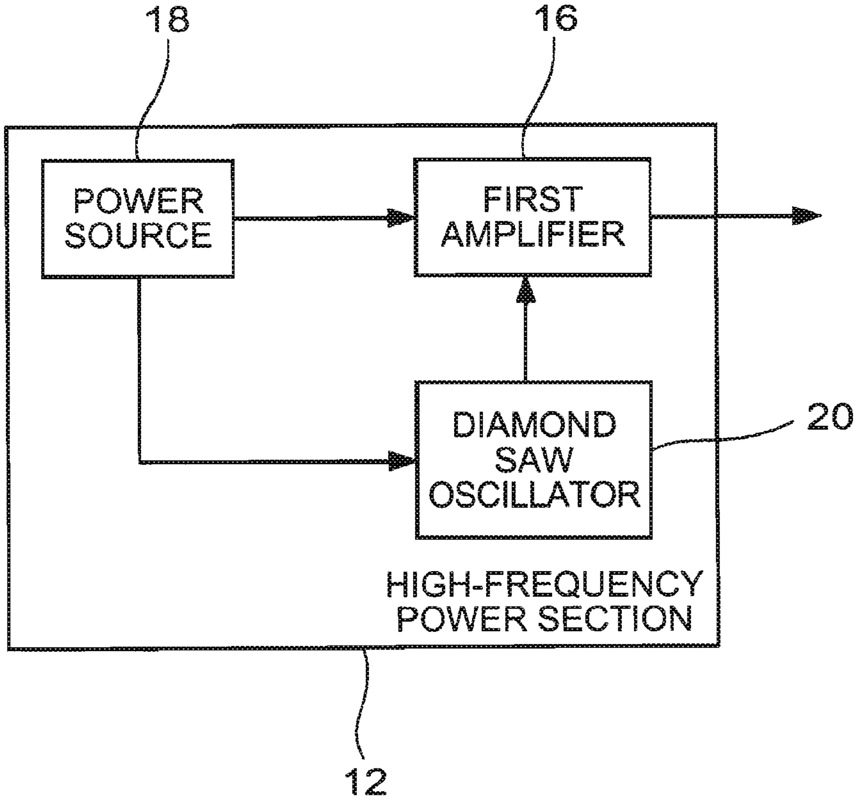
FIG. 2 is a block diagram of the high-frequency power section.

More particularly, the high-frequency power section 12 is configured as shown in the block diagram in FIG. 2. The high-frequency power section 12 includes a diamond SAW oscillator 20, a first amplifier 16 and a power source 18. The power source 18 supplies power to the diamond SAW oscillator 20 and to the first amplifier 16. The downstream portion of the diamond SAW oscillator 20 is connected to the upstream portion of the amplifier 16. The high-frequency signals outputted from the diamond SAW, oscillator 20 are amplified in the first amplifier to be subsequently outputted therefrom. The high-frequency signals outputted from the first amplifier 16 are the high-frequency signals outputted from the high-frequency power section 12

Figure 3:
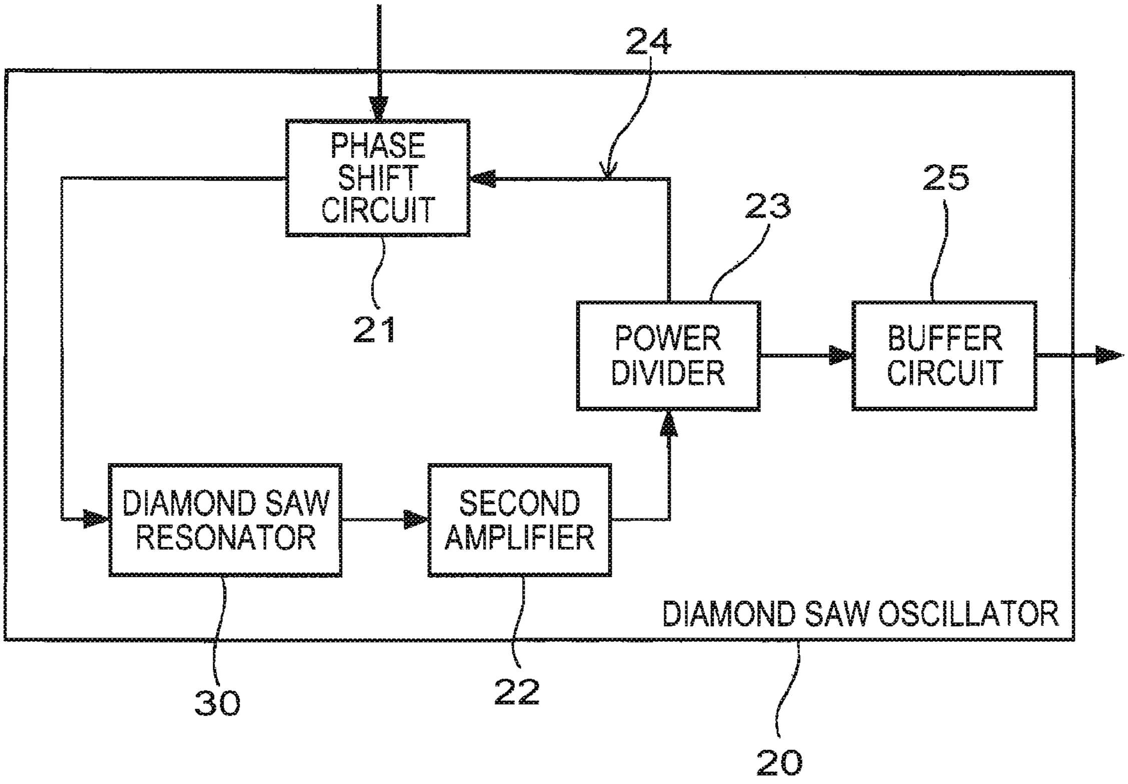
FIG. 3 is a block diagram of the diamond SAW oscillator.

More particularly, the diamond SAW oscillator 20 is configured as shown in the block diagram in FIG. 3. The diamond SAW; oscillator 20 includes a looped circuit 24 and a buffer circuit 25, the looped circuit including a phase shift circuit 21, a diamond SAW resonator 30, a second amplifier 22 and a power divider 23, and the buffer circuit being connected to the downstream portion (the output side) of the power divider 23. The phase shift circuit 91 varies the phase of the looped circuit 24 by inputting power from the power source 18, i.e. by inputting control voltage from outside. The downstream portion of the phase shift circuit 21 is connected to the diamond SAW resonator 30. The SAW resonator 30 excites SAW of a prescribed frequency on a substrate 34 and outputs high-frequency signals that correspond to the frequency of the SAW.

The second amplifier 22 is connected subsequent to the diamond SAW resonator 30. The second amplifier 22 amplifies the high-frequency signals outputted from the diamond SAW resonator 30. The power divider 23 is connected subsequent to the second amplifier, The power divider 23 distributes the inputted high-frequency signals to the phase shift circuit 21 and to the buffer circuit 25 that are connected subsequent to the power divider 23. The power divider 23 may be of any type that is capable of distributing power, including, for example, a Wilkinson divider.

Figure 4:
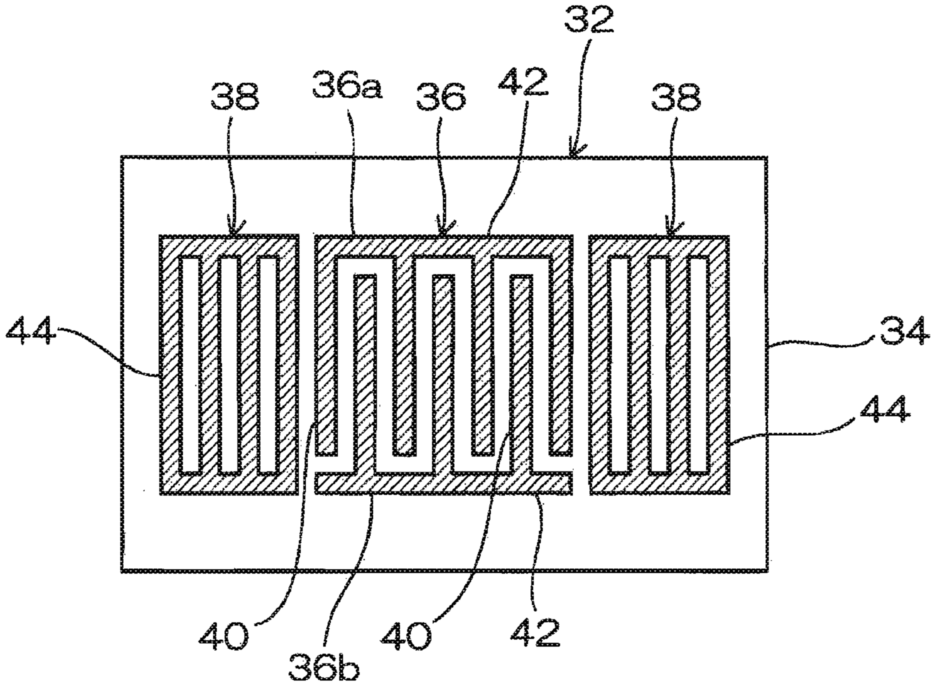
FIG. 4 is a schematic plan view of the diamond SAW resonator element.

More particularly, the diamond SAW resonator 30 has a diamond SAW resonator element 32 that is shown by the schematic plan view in FIG. 4. The diamond SAW resonator element 32 uses diamond for a piezoelectric substrate (substrate) 34. The substrate 34 using diamond may one cut off from a diamond wafer, one provided with a piezoelectric layer on diamond or diamond-like carbon, one provided with a semi-conductive diamond layer and a piezoelectric layer on diamond or diamond-like carbon, or such other one. The piezoelectric material used for the piezoelectric layer may be zinc oxide, aluminum nitride, or the like, and may be formed by a deposition method such as the vapor growth method. The substrate 34 made of diamond is good in the frequency temperature behavior and fast in the SAW propagation rate, thus being capable of outputting high-frequency signals (e.g. 2.4 GHz band).

The diamond SAW resonator element 32 has at least a comb-like electrode (IDT) 36 placed on such a substrate 34 using diamond. FIG. 4 shows the substrate 34 upon which the IDT 36 and reflectors 38 are placed. The IDT 36 has comb teeth 42 that are each formed by connecting the base ends of a plurality of electrode fingers 40, and the two comb teeth 42 are made to mesh with each other to form the IDT 36 by alternately engaging their electrode fingers 40. One of the comb teeth 42 is an input IDT 36*a* while the other of the comb teeth 42 is an output IDT 36*b*. The reflectors 38 are placed so as to sandwich the IDT 36. The reflectors 38 each has a plurality of conductor strips 44 that are placed in line with the direction of the electrode fingers 40 of the IDT 36, being connected at both ends.

When inputted with electric signals, the diamond SAW resonator 30 having the diamond SAW resonator element 39 immediately excites SAW on the substrate 34 by making the input IDT 36*a* to input the signals, and contains the SAW, between the reflectors 38. The SAW is multiply reflected by the reflectors 38, thereby generating standing waves between the reflectors 38. When the SAW reaches the output IDT 36*b*, the SAW resonator 30 converts the SAW into electric signals of a frequency corresponding to the frequency of the SAW (high-frequency signals) to output the electric signals.

Figure 5:
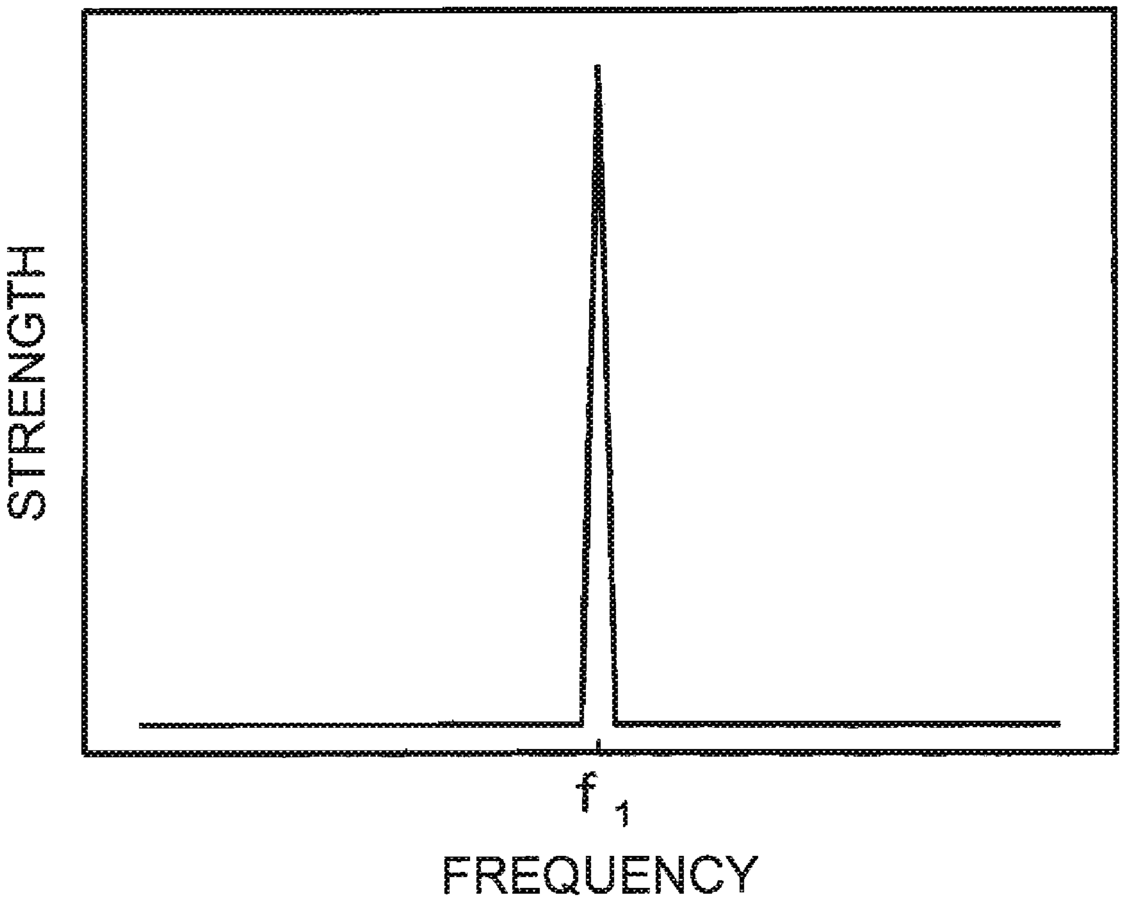
FIG. 5 is a diagram showing the relation between the frequency and the strength of the signals outputted from the diamond SAWSAW oscillator.

In this way, the diamond SAW resonator 30 can output signals of a specific frequency $f_1$ (high-frequency signals) without outputting signals of a frequency other than the specific frequency $f_1$. When inputted with electric signals, the diamond SAW resonator 30 immediately outputs high-frequency signals corresponding to the SAW excited on the substrate 34. FIG. 5 is a diagram showing the relation between the frequency and the strength of the signals outputted from the diamond SAW oscillator 20. In FIG. 5, the axis of abscissas represents the frequency and the axis of ordinate represents the strength. The diamond SAW, oscillator 20 outputs only high-frequency signals of a specific frequency $f_1$, as shown in FIG. 5.

A plurality of diamond SAW resonators 32 can be obtained from a sheet of wafer using diamond. In outline, the process of manufacturing the diamond SAW resonator 32 includes: first forming a metal coating on a wafer; applying resist onto the metal film and then placing a photo mask corresponding to the electrode pattern of the IDT 36, reflectors 38, and the like, onto the metal film; developing after irradiation of UV rays onto the resist via the photo mask to form a resist film corresponding to the electrode pattern; etching the metal film to form a plurality of electrode patterns on the wafer; and then cutting off the wafer into chips to make the diamond SAW resonator elements 32. In this case, anodic oxidation may be performed on the surface of the electrode pattern to form an insulating film. A fine processing technology is employed to manufacture the diamond SAW resonator element 32, thus allowing a highly accurate formation of the electrode pattern. Therefore, using a fine processing technology, the diamond SAW resonator element 32 can be manufactured with a reduced variability in the resonance frequency within the wafer. In addition, it can also be manufactured with a reduced variability in the resonance frequency between each wafer.

Such a microwave generator 10 has a diamond SAW oscillator 20 in the high-frequency power section 12, thus being able to reliably output only signals of a specific frequency (high-frequency signals). Furthermore, the microwave generator 10 emits, from the waveguide unit 14, microwave of a frequency corresponding to the high-frequency signals outputted from the diamond SAW oscillator 20, thereby avoiding unwanted radiation. Thus, adverse effects on apparatuses using the ISM band can be prevented. Moreover, having no unwanted electric waves, the apparatuses can have improved signal purity, reduced noise and, in addition, reduced jitters. Additionally, the diamond SAW oscillator 20 never oscillates with an abnormal frequency because it outputs only high-frequency signals. Therefore, the microwave generator 10 emits no microwave on the basis of an abnormal frequency, thereby improving the reliability.

The microwave generator 10 has a substrate 34 with a good frequency temperature behavior, which, in turn, results in a good frequency temperature behavior of the generator 10, which enhances the frequency stability. Furthermore, the microwave generator 10 produces no variability in the resonance frequency between each diamond SAW resonator element 32, i.e. between each diamond SAW resonator 30. Consequently, no variability is produced between each microwave generator 10 in the high-frequency signals outputted from the high-frequency oscillating portion and in the frequency of the microwave outputted from the waveguide unit 14.

The microwave generator 10, when operated, immediately outputs high-frequency signals from the diamond SAW resonator 30. The signals are then outputted from the diamond SAW oscillator 20, resulting in microwave radiation from the waveguide unit. Thus, the starting time for outputting microwave can be made shorter. The diamond SAW oscillator 20 can also output high-frequency signals by no more than several tens of milliamperes of current, thereby allowing a power reduction in the high-frequency power section 12. Furthermore, the diamond SAW oscillator 20 can be so configured as to have the diamond SAW, resonator 30, the phase shift circuit 21, the second amplifier 22, the power divider 23 and the buffer circuit 25 all mounted in one package. Consequently, the high-frequency power section 12 that includes the diamond SAW oscillator 20 can be reduced in size and weight.

Second Embodiment

A second embodiment of the invention describes a transformed example of the diamond SAW oscillator described in the first embodiment. The second embodiment will omit description of the components that are the same as in the first embodiment, providing them with the same numbers as in the first embodiment.

Figure 6:
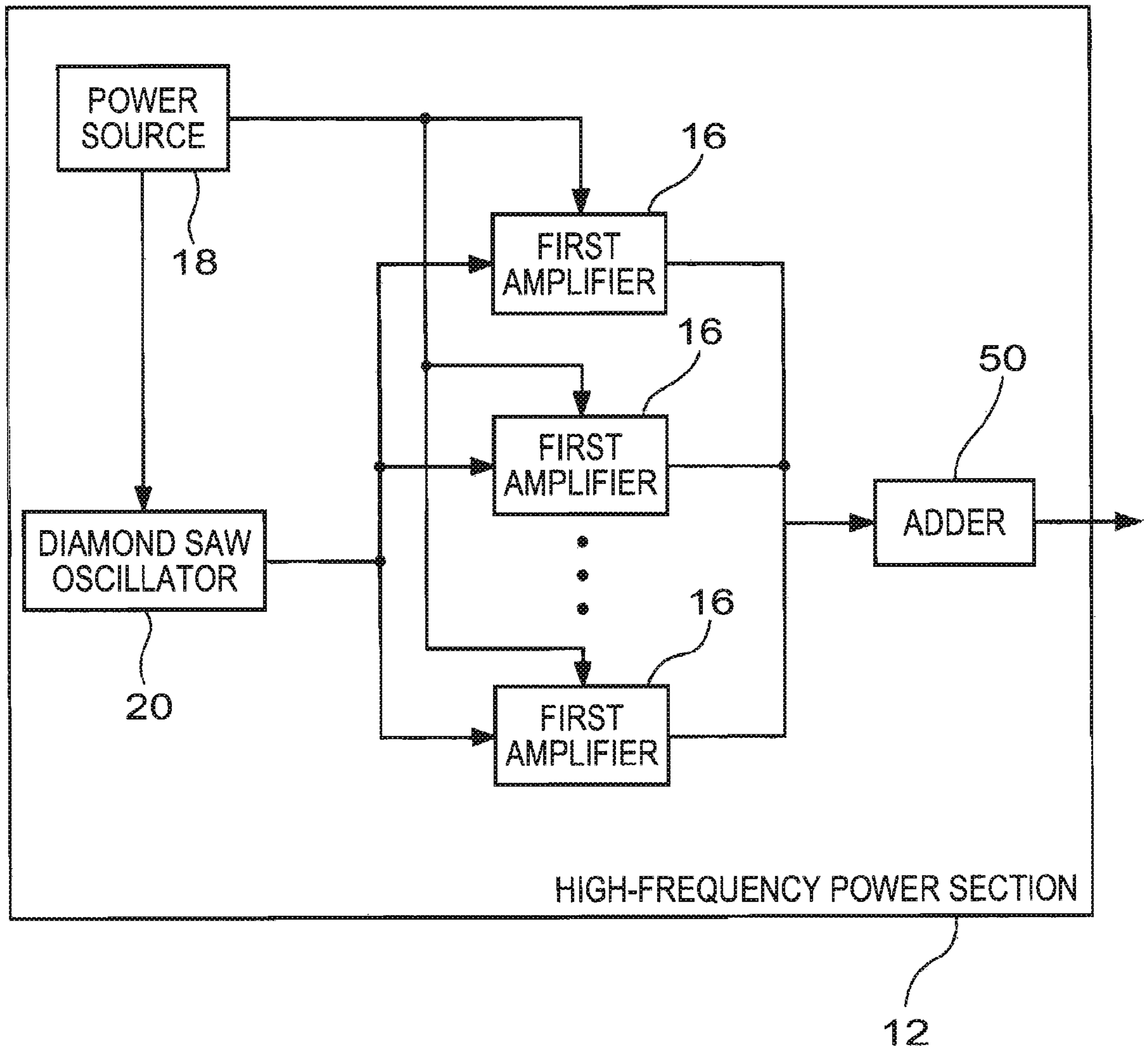
FIG. 6 is a block diagram of the high-frequency power section according to a second embodiment.

FIG. 6 is a block diagram of a high-frequency power section according to the second embodiment of the invention. The high-frequency power section 12 includes the diamond SAW oscillator 20, a plurality of the first amplifiers 16, an adder 50 and the power source 18. The power source 18 supplies power to the diamond SAW oscillator 20 and to each of the first amplifiers 16. The plurality of first amplifiers 16 are connected in parallel between the diamond SAW oscillator 20 and the adder 50. The high-frequency signals outputted from the diamond SAW oscillator 20 are inputted to each of the first amplifiers 16. The first amplifiers 16 amplify the high-frequency signals inputted from the diamond SAW oscillator 20 and output them to the adder 50. The adder 50 adds together the high-frequency signals inputted from the first amplifiers 16 and outputs the added high-frequency signals. The high-frequency signals outputted from the adder 50 are the high-frequency signals outputted from the high-frequency power section 12.

In such a high-frequency power section 12, the high-frequency signals inputted from the diamond SAW oscillator 20 are amplified in each of the first amplifiers to be combined in the adder 50. Thus, the high-frequency signals can be provided with higher power.

Third Embodiment

In a third embodiment of the invention, an example of an apparatus using the microwave generator of the first embodiment or a microwave generator mounted with the diamond SAW oscillator of the second embodiment will be described. Therefore, the third embodiment will omit description of the components that are the same as in the first or the second embodiment, providing them with the same numbers as in the first or the second embodiment.

Figure 7:
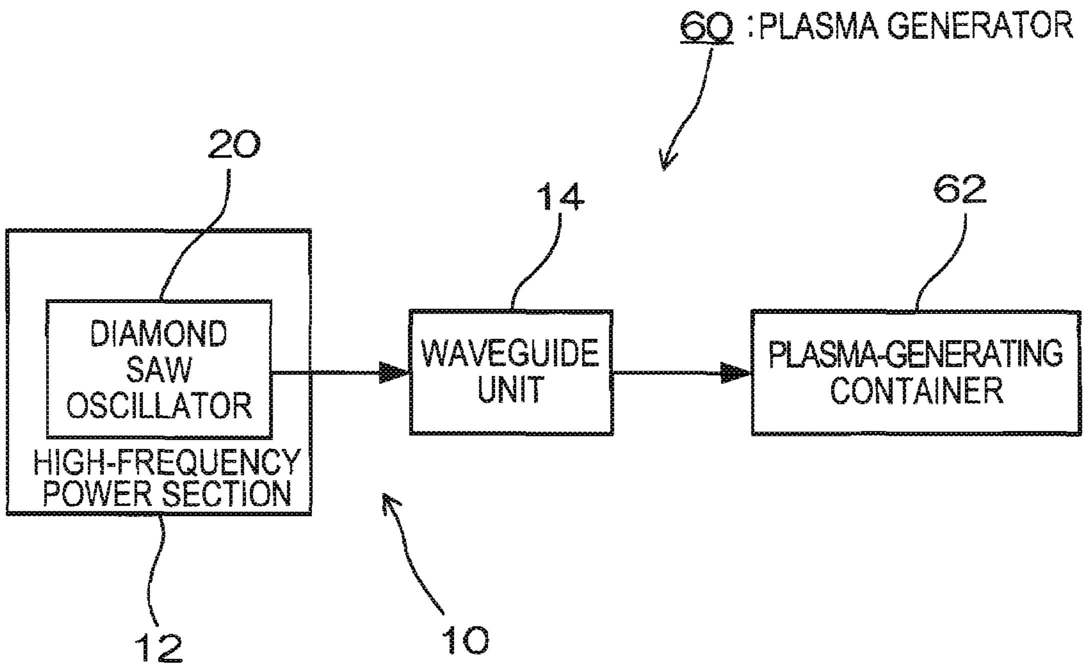
FIG. 7 is a block diagram of the plasma generator.
Figure 8:
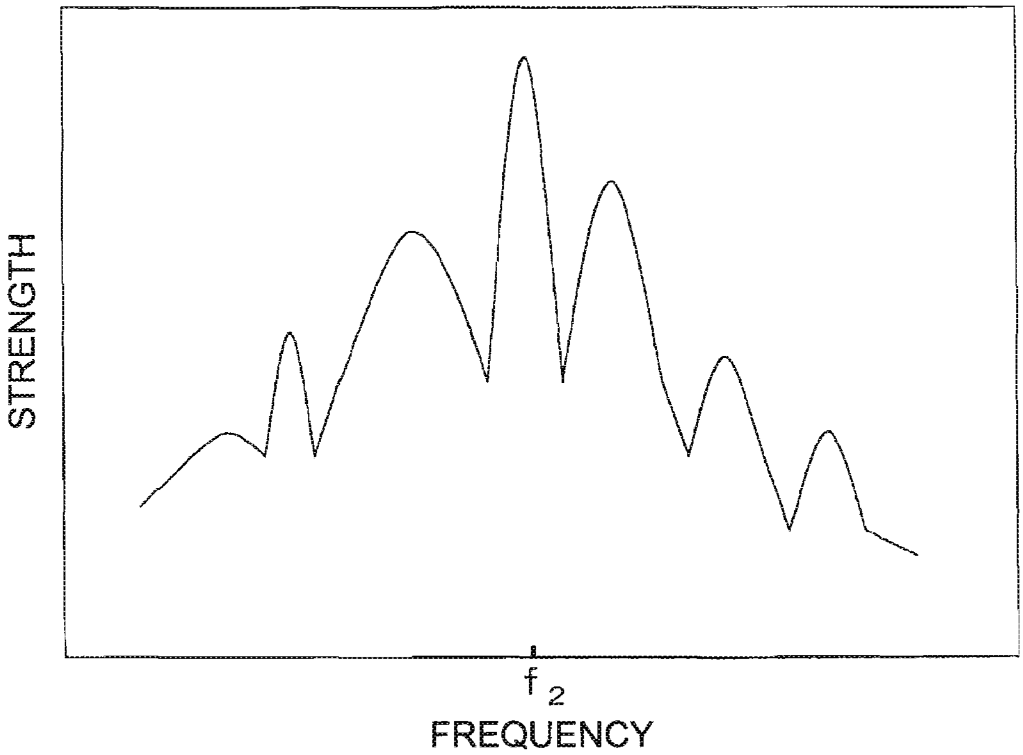
FIG. 8 is a diagram showing the relation between the frequency and the strength of the signals outputted from the magnetron.

FIG. 7 is a block diagram of a plasma generator. The plasma generator 60 has a plasma-generating container 62 for containing microwave. The plasma-generating container 62 is supplied with a gas for generating plasma and connected with a vacuum pump (not illustrated) for depressurizing the inside of the plasma-generating container 62. The plasma generator 60 also includes the diamond SAW oscillator 20 and the microwave generator 10 having the high-frequency power section 12 that outputs the high-frequency signals outputted from the diamond SAW oscillator 20 to a subsequent stage and the waveguide unit 14 that emits the high-frequency signals inputted from the high-frequency power section 12 in the form of microwave.

The antenna composing the waveguide unit 14 is provided either outside or inside the plasma-generating container 62. In FIG. 7, the antenna is provided outside the plasma-generating container 62. When the antenna is provided outside the plasma-generating container 62, the microwave emitted from the antenna may be guided to the plasma-generating container 62 by a waveguide (not illustrated) to generate plasma from the gas supplied in the plasma-generating container 62. When the antenna is provided inside the plasma-generating container, the microwave may be emitted inside the plasma-generating container 62 to generate plasma, from the gas supplied in the plasma-generating container 62. Such a plasma generator 60 can be utilized, for example, in deposition systems or etching units.

The plasma generator 60 is capable of generating plasma based on microwave having only a specific frequency without unwanted radiation. In addition, the plasma generator 60 can be reduced in the size and weight in accordance with a reduction in the size and weight of the microwave generator 10.

Among the apparatuses in which the microwave generator 10 can be used are: heating units having the microwave generator 10 and a heating container for containing microwave; drying equipments; and sterilizers. Other apparatuses that utilize the microwave generator 10 include various devices using the ISM band, such as radar systems, medical equipments and communications units.

The entire disclosure of Japanese Patent Application No. 2005-282116, filed Sep. 28, 2005 is expressly incorporated by reference herein.

What is claimed is:

1. A microwave generator, comprising:

a high-frequency power section that includes a diamond SAW oscillator and a first amplifier, and outputs a high-frequency signal;

a waveguide unit that emits the high-frequency signal inputted directly from the high-frequency power section in a form of microwave; and the first amplifier outputting the high-freciuency signal directly input from the diamond SAW oscillator.

2. The microwave generator according to claim 1, the high-frequency power section comprising:

the diamond SAW oscillator that outputs the high-frequency signal; and a power source that supplies power to the diamond SAW oscillator and to the first amplifier, the first amplifier amplifying and outputting the high-frequency signal directly input from the diamond SAW oscillator.

3. The microwave generator according to claim 1, the high-frequency power section comprising:

the diamond SAW oscillator that outputs the high-frequency signal;

a plurality of first amplifiers that are connected in parallel to the diamond SAW oscillator, each inputting the high-frequency signal from the diamond SAW oscillator;

an adder that is connected subsequent to the first amplifiers, inputting and adding the high-frequency signal outputted from each of the first amplifiers to output the added high-frequency signal; and a power source that supplies power to the diamond SAW oscillator and to the first amplifiers.

4. The microwave generator according to claim 1, the diamond SAW oscillator forming a looped circuit, the looped circuit comprising:

a phase shift circuit that inputs power;

a diamond SAW resonator that includes at least a comb-like electrode placed on a substrate using diamond;

a second amplifier that amplifies the high-frequency signal outputted from the diamond SAW resonator; and a power divider that distributes the high-frequency signal outputted from the second amplifier to the phase shift circuit and to the output side.

5. An apparatus using a microwave generator, the microwave generator according to claim 1 being used.

6. The apparatus using a microwave generator according to claim 5, the waveguide unit being placed inside a container for containing the microwave; and the microwave emitted from the waveguide unit being guided into the container.

* * * * *